(12) United States Patent
Karlsson et al.

(10) Patent No.: US 9,755,475 B2
(45) Date of Patent: Sep. 5, 2017

(54) ELECTRIC DRIVE DEVICE FOR MOTOR VEHICLE WITH OIL SUMP FORMED THEREIN FOR COOLING AND LUBRICATION

(71) Applicant: BAE Systems Hägglunds Aktiebolag, Örnsköldsvik (SE)

(72) Inventors: Pontus Karlsson, Bromma (SE); Oskar Prinsback, Järved (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 292 days.

(21) Appl. No.: 14/363,712

(22) PCT Filed: Nov. 23, 2012

(86) PCT No.: PCT/SE2012/051298
§ 371 (c)(1),
(2) Date: Jun. 6, 2014

(87) PCT Pub. No.: WO2013/085452
PCT Pub. Date: Jun. 13, 2013

(65) Prior Publication Data
US 2014/0333162 A1    Nov. 13, 2014

(30) Foreign Application Priority Data

Dec. 6, 2011 (SE) ...................... 1151162

(51) Int. Cl.
*H02K 5/22* (2006.01)
*H02K 5/20* (2006.01)
(Continued)

(52) U.S. Cl.
CPC .............. *H02K 5/225* (2013.01); *B60K 1/00* (2013.01); *B60L 15/2054* (2013.01); *H02K 5/20* (2013.01);
(Continued)

(58) Field of Classification Search
CPC .. H02K 1/00; H02K 5/04; H02K 5/20; H02K 5/225; H02K 7/116; H02K 9/06;
(Continued)

(56) References Cited

U.S. PATENT DOCUMENTS 4,543,047 A * 9/1985 Hasegawa ............ F04C 29/025
                                                    184/6.16
4,594,056 A * 6/1986 Brunner ................ F04B 23/021
                                                    222/385
(Continued)

FOREIGN PATENT DOCUMENTS

CN        102239624 A      11/2011
CN        102918751 A      2/2013
(Continued)

OTHER PUBLICATIONS

Office Action received for Australian Patent Application No. 2012348405, mailed on Apr. 6, 2016, 3 pages.
(Continued)

*Primary Examiner* — Joshua Benitez-Rosario
*Assistant Examiner* — Rashad Johnson
(74) *Attorney, Agent, or Firm* — Morrison & Foerster LLP

(57) ABSTRACT

The present invention relates to an electric drive device for driving of a motor vehicle comprising an electric motor arranged to be media supplied, the electric motor having a jacket surface and an essentially ring shaped cross section, wherein said media supply is arranged to be effected via a connection unit arranged in connection to the jacket surface of the electric motor. The invention also relates to a motor vehicle with an electric drive device.

10 Claims, 6 Drawing Sheets

(51) Int. Cl.
*H02K 9/19* (2006.01)
*B60K 1/00* (2006.01)
*B60L 15/20* (2006.01)
*H02K 7/116* (2006.01)

(52) U.S. Cl.
CPC .......... *H02K 9/19* (2013.01); *B60K 2001/001* (2013.01); *B60K 2001/006* (2013.01); *B60L 2240/425* (2013.01); *B60Y 2200/142* (2013.01); *H02K 7/116* (2013.01); *Y02T 10/641* (2013.01); *Y02T 10/645* (2013.01); *Y02T 10/72* (2013.01); *Y02T 10/7275* (2013.01)

(58) Field of Classification Search
CPC ...... H02K 9/08; H02K 9/19; B60K 2001/001; B60K 2001/006; B60L 2240/425; B60Y 2200/142; Y02T 10/645; Y02T 10/7275; Y02T 10/641; Y02T 10/72
USPC .................... 310/54, 58, 89; 415/117, 149
See application file for complete search history.

(56) References Cited

U.S. PATENT DOCUMENTS

| | | | |
|---|---|---|---|
| 5,250,863 A | 10/1993 | Brandt | |
| 5,998,896 A | 12/1999 | Early et al. | |
| 8,198,770 B2* | 6/2012 | Hassett | F16C 37/00 310/58 |
| 2005/0285457 A1 | 12/2005 | Tsutsui et al. | |
| 2007/0041852 A1* | 2/2007 | Masuda | F04C 18/045 417/410.3 |
| 2007/0278869 A1* | 12/2007 | Taketsuna | H02K 9/19 310/54 |
| 2009/0184591 A1* | 7/2009 | Hoshino | H02K 3/24 310/54 |
| 2009/0318255 A1* | 12/2009 | Kato | B60K 1/00 475/149 |
| 2010/0164310 A1* | 7/2010 | Dames | H02K 1/32 310/54 |
| 2010/0181873 A1 | 7/2010 | Kern et al. | |
| 2011/0156509 A1* | 6/2011 | Minemura | H02K 9/19 310/54 |
| 2011/0285220 A1 | 11/2011 | Sonohara et al. | |
| 2012/0142474 A1* | 6/2012 | Troennberg | B60K 1/00 475/149 |
| 2012/0196714 A1* | 8/2012 | Murata | F16F 15/31 475/149 |
| 2013/0057117 A1* | 3/2013 | Suzuki | B60K 7/0007 310/60 R |
| 2013/0200737 A1* | 8/2013 | Karlsson | B60K 7/0007 310/89 |
| 2016/0137044 A1* | 5/2016 | Engblom | H02K 5/00 310/75 R |

FOREIGN PATENT DOCUMENTS

| | | |
|---|---|---|
| DE | 3936928 A1 | 5/1991 |
| DE | 102007042456 A1 | 3/2009 |
| DE | 102008040873 A1 | 2/2010 |
| EP | 0190602 A1 | 8/1986 |
| EP | 190602 A1 | 8/1986 |
| EP | 2505411 A1 | 10/2012 |
| WO | 2011/065179 A1 | 6/2011 |

OTHER PUBLICATIONS

Written Opinion received for Singapore Patent Application No. 11201402349X, mailed on Apr. 7, 2015, 10 pages.
International Search Report and Written Opinion received for PCT Patent Application No. PCT/SE2012/051298, mailed Mar. 5, 2013, 10 pages.
International Preliminary Report on Patentability received for PCT Patent Application No. PCT/SE2012/051298 mailed Jun. 19, 2014, 7 pages.
Extended European Search Report (includes Supplementary European Search Report and Search Opinion) received for European Patent Application No. 12854710.6, mailed on Jun. 15, 2015, 6 pages.
Office Action received for Chinese Patent Application No. 201280060020.7, mailed on Aug. 3, 2016, 7 pages (4 pages of English Translation and 3 pages of Official Copy).
Office Action received for Chinese Patent Application No. 201280060020.7, mailed on Feb. 1, 2016, 19 pages (8 pages of English Translation and 11 pages of Official Copy).

* cited by examiner

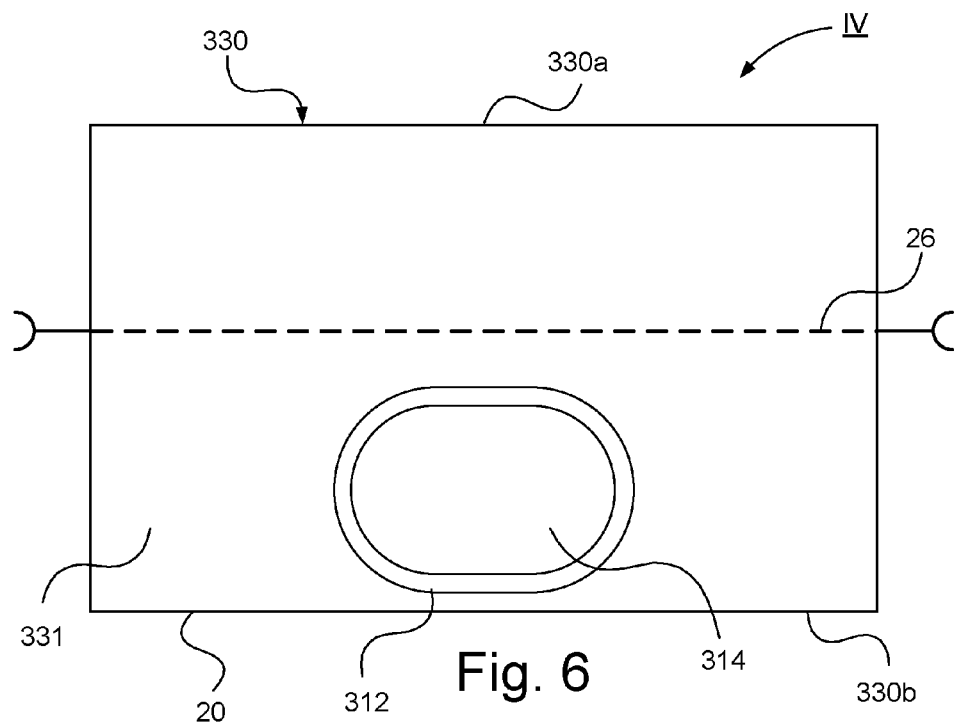
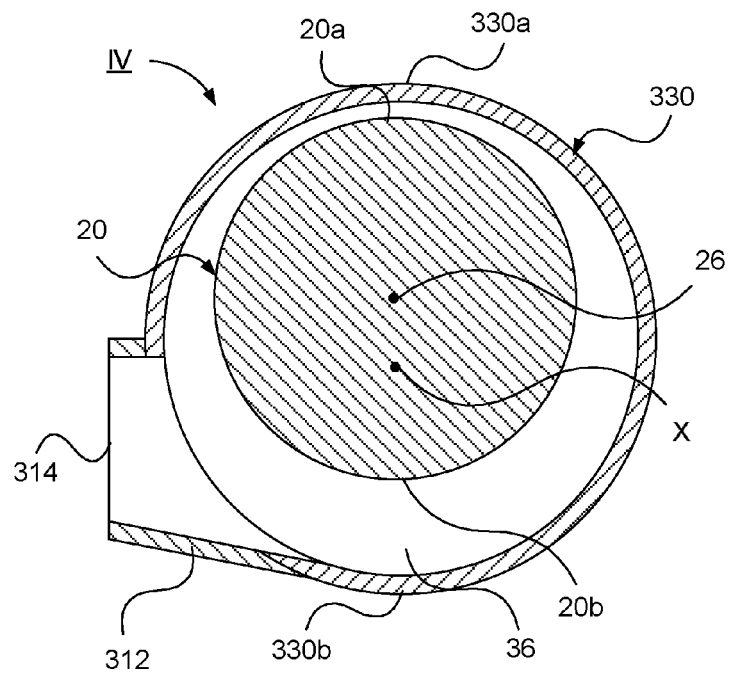

ELECTRIC DRIVE DEVICE FOR MOTOR VEHICLE WITH OIL SUMP FORMED THEREIN FOR COOLING AND LUBRICATION

CROSS REFERENCE TO RELATED APPLICATIONS

This application is a U.S. National Phase patent application of PCT/SE2012/051298, filed on Nov. 23, 2012, which claims priority to Swedish Patent Application No. 1151162-3, filed on Dec. 6, 2011, each of which is hereby incorporated by reference in the present disclosure in its entirety.

TECHNICAL FIELD

The invention relates to an electric drive device for motor vehicle according to the preamble of claim 1. The invention also relates to a motor vehicle.

BACKGROUND

The vehicle industry is going through a phase of change in which the vehicles are electrified to a greater extent, a trend being hybridization to different degrees. High demands are put on compactness and great power and torque output.

A problem in such electric drive devices of heavy vehicles is that large external loads acts on the drive device, which have to be absorbed without being transferred to the electric motor. In addition the space is narrow, the electric components being located in an exposed environment, the character of the ground being a variable to consider.

OBJECTS OF THE INVENTION

An object of the present invention is to provide an electric drive device for drive of a motor vehicle which facilitates a compact and volume efficient construction, and easy and efficient drive.

SUMMARY OF THE INVENTION

These and other objects, apparent from the following description, are achieved by means of an electric drive device and a motor vehicle which are of the type stated by way of introduction and which in addition exhibits the features recited in the claims.

According to the invention an object is achieved by an electric drive device for driving of a motor vehicle comprising an electric motor arranged to be media supplied, the electric motor having a jacket surface and an essentially ring shaped cross section, wherein said media supply is arranged to be effected via a connection unit arranged in connection to the jacket surface of the electric motor. Hereby is facilitated, by media supplying the electric motor via the connection unit in the form of energy supply from power electronics, provision of an in axial direction compact electric drive device, the electric drive device comprising transmission configuration arranged on the respective side of the electric motor since no cables need to be connected/taken out on any of the sides of the electric motor such that space is made available at the ends for more compact connection of transmission configuration, where the transmission configuration may be constituted by planetary gear/reduction gear. Further is facilitated, by media supplying the electric motor via the connection unit in the form of cooling and lubrication means and where applicable transmission configurations in the form of planetary gears/reduction gears, easy and efficient cooling and lubrication of the electric drive device and consequently efficient drive.

According to an embodiment the electric drive device further comprises a housing in which the electric motor is housed, which housing has a jacket surface and an essentially ring shaped cross section, wherein said connection unit is applied to the jacket surface of said housing, and wherein said media supply is intended to be effected via an opening in said jacket surface. When the electric motor is surrounded by a housing only one opening in the housing is hereby required for connection to the connection unit. By being able to connect both cables for electric energy, conduits for lubrication means and cooling means and lines for signal connection at the same place drawing of cables/conduits/lines and clamping of the same is facilitated.

According to an embodiment of the electric drive device said connection unit is arranged between the upper and lower portion of jacket surface of said housing. Hereby the ground clearance or the height of the vehicle is not affected by the connection unit, wherein such an embodiment of the electric drive device is well suited for e.g. mining vehicles moving in limited spaces.

According to an embodiment of the electric drive device said connection unit is axially arranged essentially in connection to a central portion of the jacket surface of said housing. Hereby replacement of conventional mechanical drive line with electric drive device according to the present invention is facilitated, space centrally of the vehicle being made available where caradan shaft centrally arranged there has occupied space, wherein cables may be lead centrally in the longitudinal extension of the vehicle for connection to generator.

According to an embodiment of the electric drive device said connection unit circumferentially of the jacket surface of the housing is placed in connection to a horizontal middle plane of the jacket surface of the housing. By arranging the connection unit close/in connection to the horizontal middle plane of the housing a minimum of tension concentrations affecting the strength of the pipe during load of the load supporting housing, maximum tensile stress is found in the underside of the pipe and maximum compressive stress on the upper side of the pipe. Hereby the risk of crack formation in connection to the opening of the housing is minimized.

According to an embodiment of the electric drive device the horizontal direction of the jacket surface of the housing is running in the transverse direction of the vehicle. Hereby efficient drive is obtained in that no bevel gear or the corresponding is required.

According to an embodiment of the electric drive device said media supply comprises energy supply by means of power electronics and/or cooling and lubrication means supply.

According to an embodiment the electric drive device further comprises arrangements for controlling said media supply via said connection unit to an applicable extent. Hereby improved performance and reliable drive the electric drive device is facilitated, where prioritization of cooling/lubrication according to a variant is effected by firstly providing transmission configurations such as planetary gears/reduction gears with lubrication means securing driveability of the vehicle in that risk for transmission configuration failing is avoided, wherein the next prioritization is cooling of the electric motor. This may e.g. be relevant if the capacity of pump for pumping of lubrication means is reduced. Cooling and lubrication is according to a variant effected with the same medium, preferably oil.

According to an embodiment the electric drive device further comprises arrangements for outputting information relating to drive of the electric drive device via the connection unit. Hereby the possibility of providing information regarding drive of the electric drive device is utilized in an efficient and place saving way, where the information may comprise level of cooling and lubrication means, temperature and position of electric motor, pressure of cooling and lubrication means, wherein sensor members are arranged for providing of information, signal from sensor members then being led via the connection unit.

According to an embodiment of the electric drive device an oil sump is arranged at the bottom of the housing in a desired space between the electric motor and said housing under the lower portion of the jacket surface of the electric motor for said cooling and lubrication means supply. Hereby efficient lubrication of gear wheels/gears and pick up of oil cooling medium for cooing of the electric motor.

According to an embodiment of the electric drive device the electric motor has a stator and a rotor arranged to rotate a drive shaft, wherein the electric motor is arranged in the housing in such a way that the centre of rotation of the drive shaft of the electric motor runs essentially parallel to and at a distance from an imaginary centre axle of the housing for forming said desired space. Hereby a compact, volume efficient and stable device is facilitated at the same time as space is set free for e.g. oil sump and/or differential/differential shaft in the housing. Further is facilitated collection of connections via the connection unit for media supply comprising cooling and lubrication means to the oil sump and facilitation for outtake of cables via the connection unit out of the housing.

According to an embodiment the electric drive device further comprises a differential device with a shaft configuration arranged in the housing in the desired space between electric motor and housing. Hereby a compact solution with differential device for differential function is obtained, which differential device is connected to planetary gears, wherein efficient drive is facilitated.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 6 schematically shows a side view of an electric drive device with an opening for connection unit according to an embodiment of the present invention;

FIG. 7 schematically shows a radial cross sectional view of the electric drive device according to FIG. 6;

FIG. 8b schematically shows a view from above of a differential device of the electric drive device in FIG. 8a.

DETAILED DESCRIPTION

Figure 1:
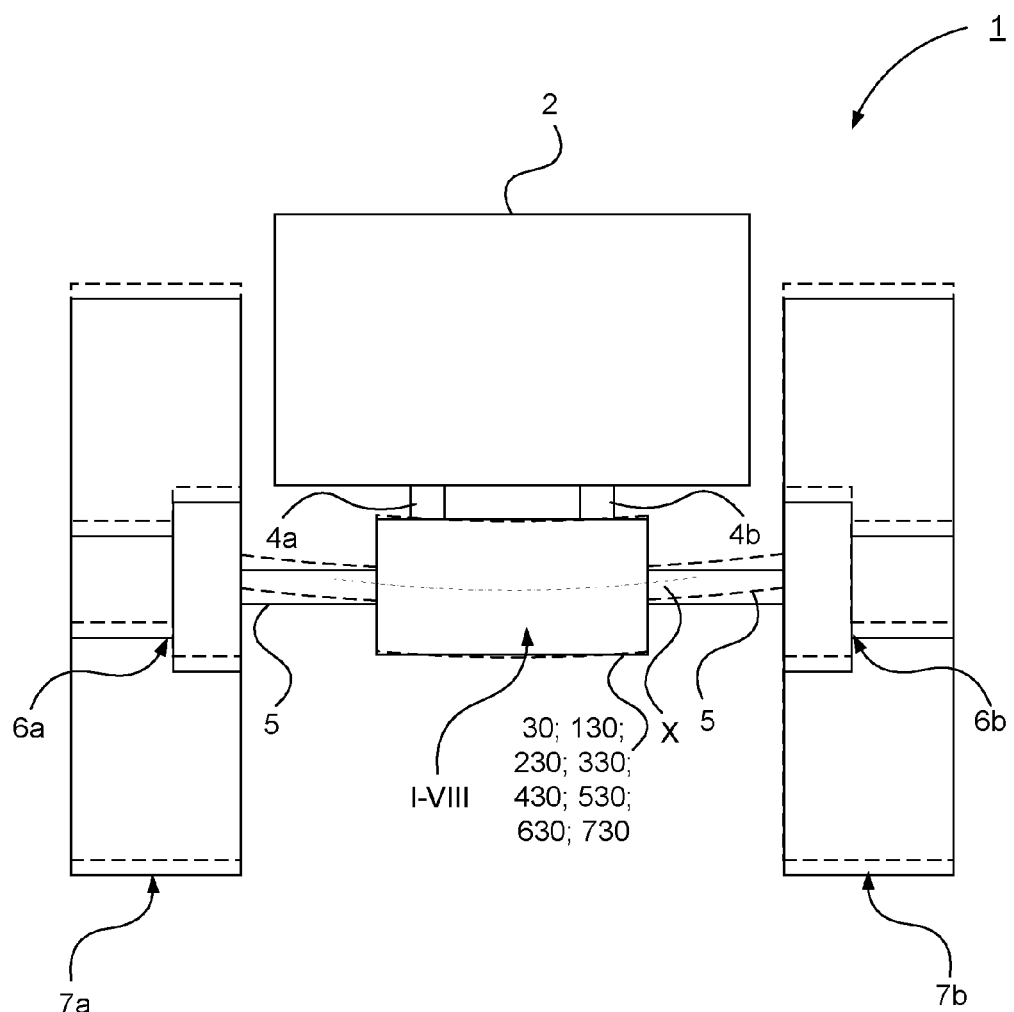
FIG. 1 schematically illustrates a motor vehicle according to an embodiment of the present invention.

FIG. 1 schematically illustrates a motor vehicle 1 according to an embodiment of the present invention. The exemplified vehicle 1 is constituted by a vehicle in the shape of a work vehicle such as a mine vehicle. The vehicle is according to an alternative variant constituted by a military vehicle. The vehicle is according to a variant constituted by any suitable vehicle where conventional axles are used. The motor vehicle 1 comprises an electric drive device I-VIII according to any of the embodiments I; II; III; IV; V; VI; VII; VIII according to the present invention. The motor vehicle 1 is intended to be propelled by means of the drive device I-VIII. The motor vehicle 1 comprises a vehicle body 2 comprising a vehicle frame.

Figure 2:
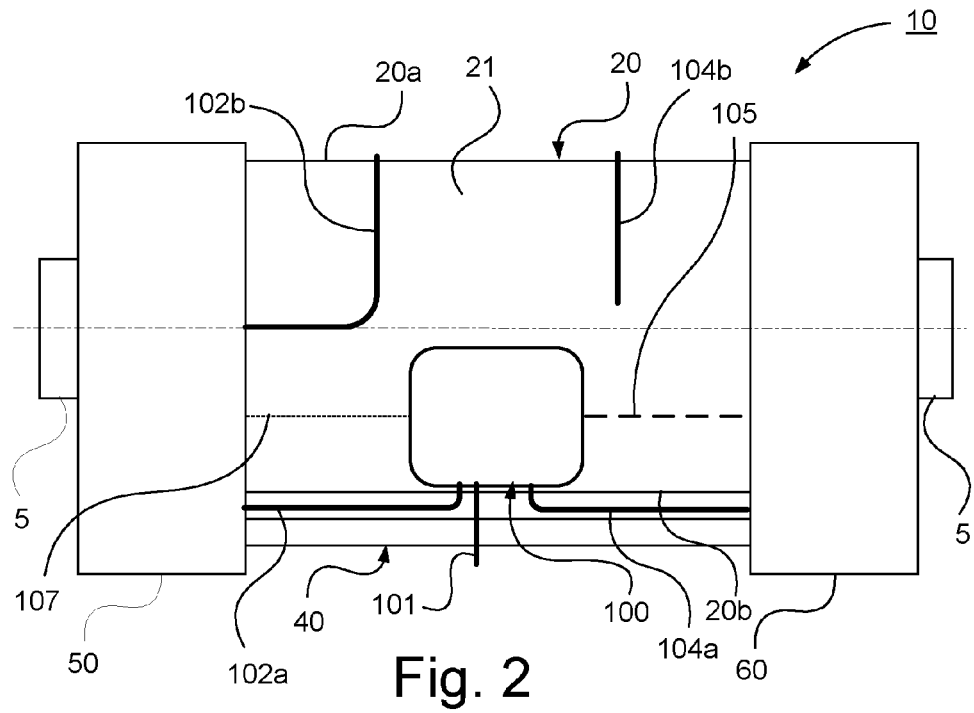
FIG. 2 schematically illustrates a front view of an electric drive unit of an electric drive device comprising electric motor and connection unit according to an embodiment of the present invention.
Figure 3:
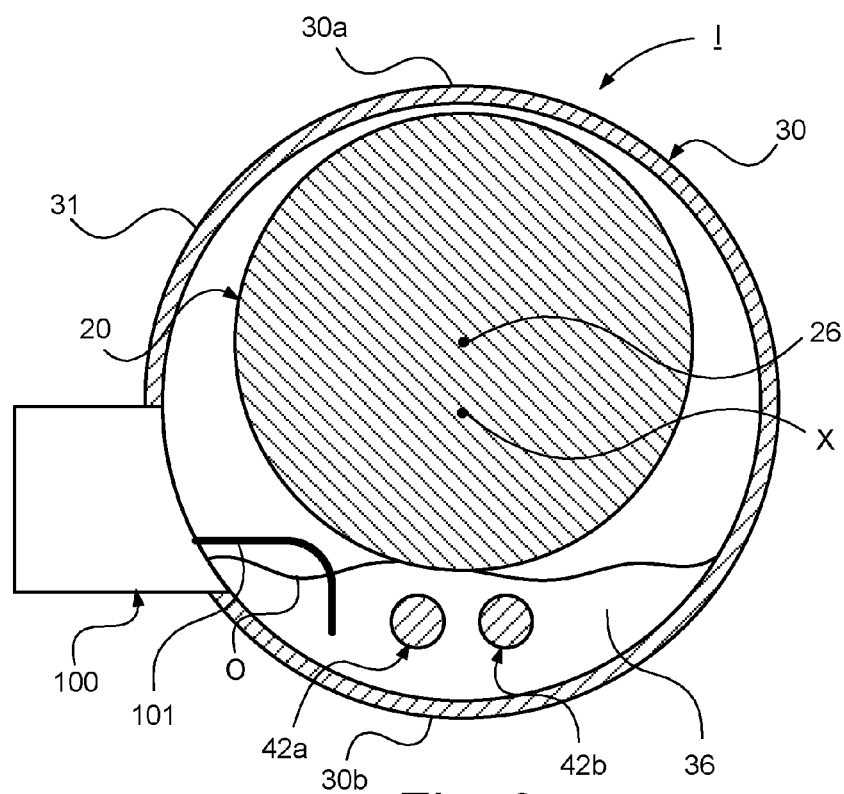
FIG. 3 schematically shows a radial cross sectional view of an electric drive device according to the present invention, comprising a drive unit according to FIG. 2.
Figure 8A:
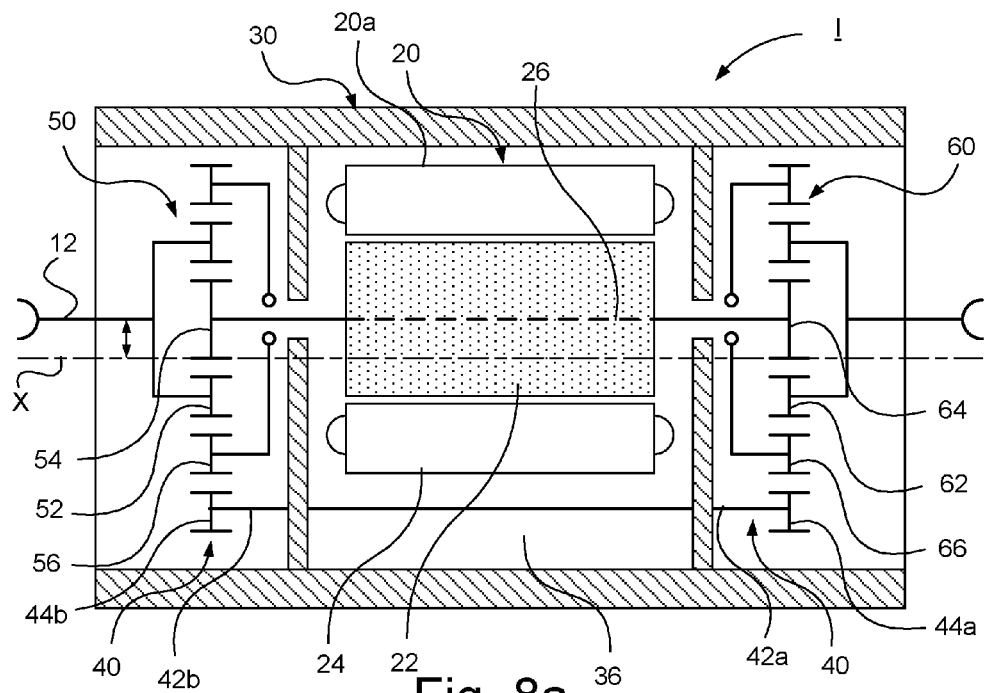
FIG. 8a schematically shows an axial cross sectional view of the electric drive device in FIG. 2.

FIG. 2 schematically illustrates a front view of an electric drive unit 10 according to an embodiment of the present invention, FIG. 3 a radial cross sectional view of an electric drive device I comprising an electric drive unit 10 according to FIG. 2 and FIG. 8a an axial cross sectional view of the electric drive device in FIG. 3.

The electric drive device I-VIII comprises an electric drive unit, e.g. according to the electric drive unit 10 in FIG. 2.

The electric drive unit 10 comprises an electric motor 20 and transmission configurations 50, 60 arranged on each side of the electric motor 20 of which a variant is shown in FIG. 8a. The electric drive unit further comprises a differential device 40 arranged superposed and connected to said transmission configurations 50, 60 for provision of a differential function.

The electric drive device I-VIII comprises a housing 30; 130; 230; 330; 430; 530; 630; 730 arranged to house said electric drive unit 10 or corresponding electric drive unit comprising electric motor 20. The electric drive device I-VIII, i.e. housing with electric motor 20 and according to a variant transmission configuration, is according to a preferred embodiment and as shown in FIG. 1 transverse to the direction of travel of the vehicle such that a cardan shaft is not required.

The electric motor 20 has an essentially circular cylindrical shape. The electric motor 20 has a jacket surface 21. The electric motor 20 when arranged in the vehicle 1 for drive of the vehicle has an upper jacket surface area 20a and a lower jacket surface area 20b.

The electric drive device I-VIII comprises a drive shaft element 5 connected to said housing 30; 130; 230; 330; 430; 530; 630; 730 and wherein bending stresses in the drive shaft element 5 are transferable to said housing 30; 130; 230; 330; 430; 530. Hub members 6a, 6b are arranged at the respective end of the drive shaft element 5. The hub members 6a, 6b are according to a variant constituted by hub reductions 6*a*, 6*b*. The hub members are according to an alternative variant constituted by drive wheels for tracked vehicles, which according to a variant comprise hub reduction gears. Ground engaging members 7*a*, 7*b* are arranged at the respective hub reduction 6*a*, 6*b* for propulsion of the vehicle 1. The ground engaging members 7*a*, 7*b* are according to a variant constituted by wheels. According to an alternative variant the ground engaging members 7*a*, 7*b* are constituted by tracks.

Said drive shaft element 5 is arranged to run essentially transversal to the longitudinal direction of the vehicle 1 intended to be propelled by means of the electric drive device I-VIII. Said drive shaft element 5 is according to an embodiment arranged essentially coaxially to said electric motor 20, i.e. aligned with the drive shaft of the electric motor. Hereby efficient drive of the vehicle 1 is obtained. According to an alternative embodiment said drive shaft element 5 is arranged radially displaced relative to said electric motor, said drive shaft element according to a variant being displaced relative to the electric motor such that the ground engaging members are displaced forward in the longitudinal direction of the vehicle such that among others handling of obstacles is improved.

The housing 30; 130; 230; 330; 430; 530; 630; 730 of the electric drive device is configured in such a way and attached to the frame construction of the vehicle body such that transfer of outer load to electric motor 20 is minimized such that essentially all loads is absorbed by the housing 30; 130; 230; 330; 430; 530; 630; 730 wherein the housing due to bending of outer loads while bending of the electric motor 20 essentially is avoided such that stator and rotor of the electric motor 20 are not brought into contact with each other such that the electric motor 20 is destroyed.

The electric drive device is according to a variant intended to drive heavy vehicles such as work vehicles. The electric dive device is according to a variant intended to deliver relatively high output torques and having a relatively high output speed. According to a variant the electric drive device comprising said hub reduction 6*a*, 6*b* configured to deliver output torque in the magnitude of 200 kNm, for the electric drive unit excluding the hub reduction the corresponding torque is in the magnitude of 10-20 kNm, according to this embodiment, and having a maximal output sped closer to 100 rpm, for the electric drive unit excluding the hub reduction the corresponding speed is closer to 2000 rpm.

The housing 30; 130; 230; 330; 430; 530; 630; 730 is configured to be load carrying and constructed to withstand heavy loads, according to a variant loads in the magnitude of 100-400 tonnes. The housing 30 is arranged to support said outer loads at said attachment. The housing 30 is configured such that outer loads, e.g. from the sides via e.g. hub reduction are transferred up in the structure of the housing 30; 130; 230; 330; 430; 530; 630; 730 such that such loads do not affect transmission configurations or electric motor 20. The housing 30; 130; 230; 330; 430; 530; 630; 730 is arranged to absorb drive torque from the electric motor 20. Such loads comprise loads arisen during drive of the electric drive device, loads from above etc.

Said above mentioned values are only example and any suitable electric drive device may be used depending on application. Consequently the present invention comprises an electric drive device having higher torque than 200 kNm or substantially lower output torque than 200 kNm, and may be constructed for heavier loads than 100-400 tonnes, or lighter loads than 100-400 tonnes.

The electric drive unit 10 comprises a connection unit 100 shown in FIG. 2 via which the electric motor 20 is intended to be media supplied, said media supply comprising electric energy supply and cooling and lubrication means supply. The connection unit 100 is configured for connection of cables 105 for electric energy supply and conduits 102*a*, 102*b*, 104*a*, 104*b* for cooling- and lubrication means. The connection unit 100 is intended to be arranged in connection to the jacket surface 21 of the electric motor. Said media supply is consequently arranged to be effected via the connection unit 100 being arranged in connection to the jacket surface 21 of the electric motor 20.

The connection unit 100 is according to this variant arranged between the upper jacket surface area 20*a* and the lower jacket surface area 20*b* of the jacket surface. The connection unit 100 is according to his variant arranged centrally at the axial extension of the jacket surface 21, i.e. essentially in the area between the plane of the end portions of the electric motor 20, i.e. at the jacket surface 21 of the electric motor 20 in the area for the vertical middle plane of the electric motor 20, at the lower jacket surface area 20*b* of the electric motor 20, i.e. below the horizontal middle plane of the electric motor.

The connection unit 100 comprises connection interfaces for cables for said electric energy supply.

The connection unit 100 comprises connection interfaces for connection of conduit configuration for pumping cooling and lubrication means for cooling and lubrication means supply of the transmission configuration 50, 60 and electric motor by means of a pump unit not shown. The conduit configuration comprises an uptake conduit 101 for taking up oil from oil sump for pumping via heat exchanger back via the connection unit 100 for supply of electric motor 20 and transmission configuration 50, 60.

The connection unit 100 comprises connection interfaces for said cooling and lubrication conduits 101, 101, 102*a*, 102*b*, 104*a*, 104*b* intended for transport of cooling and lubrication means for cooling and lubrication of electric motor 20 and transmission configurations 50, 60. Said cooling and lubrication conduits are arranged to be led via said transmission configurations 50, 60 for lubrication of gears of the transmission configuration by means of lubrication means and about the jacket 21 of the electric motor 20 for cooling of the electric motor 20 by means of cooling means, said lubrication means and cooling means according to an embodiment being constituted by oil from the same source in the form an oil sump O.

FIG. 3 schematically shows a radial cross sectional view of an electric drive device I according to the present invention, comprising a drive unit according to FIG. 2. The electric drive device I is described in more detail below with reference to FIG. 8*a*. The electric drive device I comprises the electric motor 20 and a housing 30 in which the electric motor 20 is housed. The housing 30 has a jacket surface 31 and an essentially ring shaped cross section. Said connection unit 100 is attached to the jacket surface 31 of said housing, wherein said media supply is intended to be effected via an opening in said jacket surface 31 of the housing 30. Said jacket surface 31 of the housing 30 has an upper portion 30*a* and a lower portion 30*b*, said connection unit 100 being arranged between said uppermost and lowermost portion 30*a*, 30*b*. By arranging the connection unit 100 between the uppermost and lowermost portion 30*a*, 30*b* ground clearance of the vehicle is not affected by the connection unit 100 and also not the height of the vehicle. Further the connection unit 100 is according to a variant arranged in connection to the jacket surface 31 of the housing such that splash in the form of e.g. stone, grovel, mud and/or water taken up from ground engaging members connected to other drive shaft such as wheels is prevented from ending up on the connection unit 100.

An axially running space 36 under the jacket surface of the electric motor 20 is utilized as oil sump O. According to this embodiment the volume is made available by having the electric motor 20 eccentrically arranged relative to the housing 30. The space 36 makes room for axle configuration 42*a*, 42*b* of differential device described with reference to FIGS. 8*a* and 8*b*, and in the prolongation also a differential brake/torque vectoring not shown.

Figure 4A:
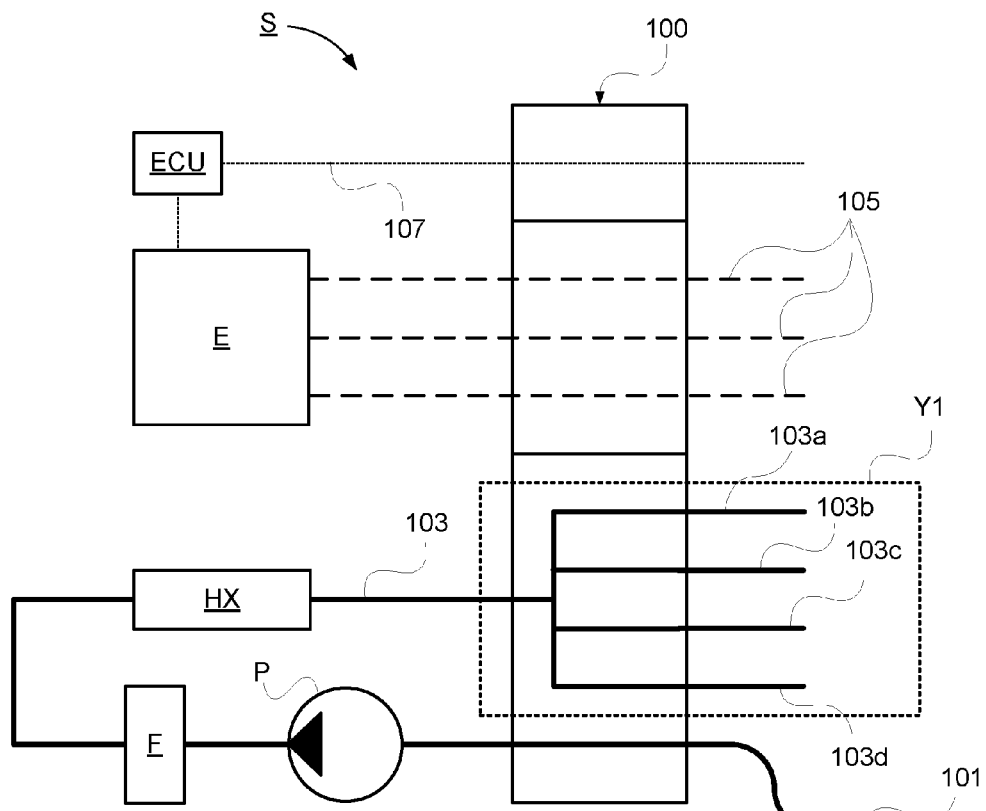
FIG. 4a schematically illustrates a system for supply via a supply unit of the drive unit of the electric drive device according to an embodiment of the present invention.

FIG. 4*a* schematically illustrates a system S for supply of supply means via a connection unit of the electric drive device according to an embodiment of the present invention.

The system comprises said connection unit 100. The system further comprises a pump unit P arranged in a conduit configuration to pump cooling and lubrication means, according to a variant oil, from a space at the bottom of housing of electric drive device according to the present invention, through an uptake conduit 101 via said connection unit 100. The system S further comprises a filter member F arranged downstream of the pump unit P and configured to filter cooling and lubrication means pumped from the space. The system S further comprises a heat exchanger HX arranged downstream of the pump unit P and configured to cool cooling and lubrication means.

The conduit configuration comprises an inlet conduit 103 arranged downstream of the heat exchanger HX which inlet conduit is connected to the connection unit 100 for supply of cooling and lubrication means to the transmission configuration and electric motor. Said inlet conduit 103 is branched in connection to the connection unit 100 in a set of supply conduits 103*a*, 103*b*, 103*c*, 103*d* for facilitating prioritization of supply of transmission configuration and electric motor.

According to an embodiment the connection unit 100 comprises overflow valves, not shown, being arranged to open based on predetermined pressure. Hereby prioritization of supply is arranged to be effected such that transmission configurations, according to a variant planetary gears arranged on the respective side of the electric motor, and differential configuration, firstly are supplied with cooling and lubrication means via a first supply conduit 103*a* of the set of supply conduits 103*a*, 103*b*, 103*c*, 103*d*, and thereafter the coil ends of the stator windings of the electric motor are supplied with cooling and lubrication means via a second supply conduit 103*b*, wherein thereafter a third supply conduit 103*c* is activated for supplying the rotor of the electric motor with cooling and lubrication means, and thereafter the jacket of the electric motor is supplied with cooling and lubrication means and also bearings. This is e.g. if the performance of the pump unit P is impaired, wherein the traction ability of the vehicle is secured in that the risk of failure of transmission configurations is avoided.

According to a variant cooled oil is consequently intended to be led with high pressure in the inlet conduit 103 into the connection unit 100, be branched in the set of supply conduits 103*a*, 103*b*, 103*c*, 103*d* with prioritization e.g. according to above. Oil heated by electric motor and transmission configuration is then pumped from oil sump in the bottom of the housing and led via the connection unit 100 and via the pump unit P through the filter F and via the heat exchanger HX for cooling of the oil and then back through the inlet conduit for supply of transmission configuration and electric motor.

The system S further comprises power electronics E arranged to electrically energy-supply the electric motor. Said power electronic E is connected to the electric motor via cables 105 in the form of three-phase line, which cables are connected to the electric motor via the connection unit 100.

According to an embodiment the system also comprises an electronic control unit ECU. The electronic control unit ECU is arranged to receive signals from a signal line configuration 107 via the connection unit 100. The electronic control unit is arranged to receive signals from not shown sensor members arranged in connection to electric drive unit of electric drive device according to the present invention, where said sensor members may comprise flow sensors for determining of flow rate of cooling and lubrication means, level sensors for determining of level of cooling and lubrication means of sump, pressure sensors for determining pressure of cooling and lubrication means, temperature sensors for determining temperature of electric motor, temperature sensors for determining temperature of cooling and lubrication means such as oil, positions sensor such as resolver/encoder for determining the position of the rotor of the electric motor, rotation sensors for determining the rotational speed of the rotor, particle sensor for determining amount of particles of the cooling and lubrication means such as oil in order to see if the cooling and lubrication means has become mixed up with particles which may indicate wearing of among other gear wheels, wherein the electric control unit ECU is arranged to receive signals form said sensor members representing flow data, level data, pressure data and temperature data.

The electronic control unit ECU is further connected to said power electronics E. The electronic control unit ECU is arranged to send a signal to the power electronic representing control of electric motor based on information from sensor members regarding e.g. the position of the rotor and the temperature of the electric motor.

Figure 4B:
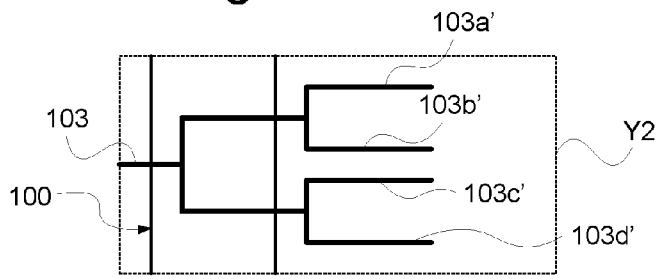
FIG. 4b a part of the system according to an alternative variant.

In FIG. 4*a* the branching of the supply conduit 103 of the branching configuration Y1 is effected in the connection unit 100. The branching of the inlet conduit 103 may be effected by means of any suitable branching configuration. FIG. 4*b* schematically shows a branching configuration Y2 where a partial branching of the inlet conduit 103 i effected in the connection unit 100, here in two conduits, wherein these conduits then are branched with/downstream of the connection unit 100 in one and two supply conduits 103*a'*, 103*b'*, and 103*c'*, 103*d'* respectively.

Figures 5A, 5B:
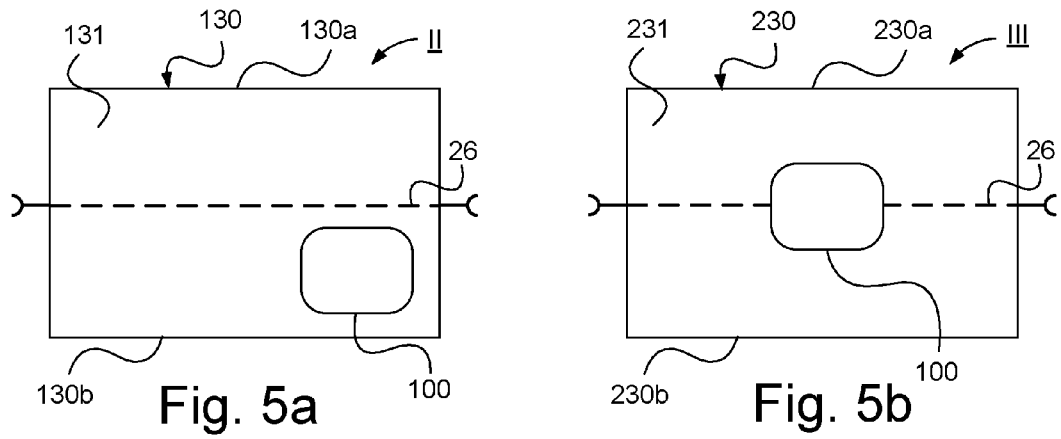
FIG. 5a schematically shows a side view of an electric drive device with a connection unit according to an embodiment of the present invention.
FIG. 5b schematically shows a side view of an electric drive device with a connection unit according to an embodiment of the present invention.

FIG. 5*a-b* schematically show side views of an electric drive device II; III according to alternative embodiments of the present invention, the placement of the connection unit 100 differing from the placement according to the embodiment illustrated in FIG. 2.

FIG. 5*a* schematically shows a side view of an electric drive device II where the connection unit 100 is arranged at an end area of the axial extension of the jacket surface 131 of the housing 130 in a lower area between the horizontal middle plane and the lower portion 130*b* of the jacket surface of the housing.

FIG. 5*b* schematically shows a side view of an electric drive device III where the connection unit 100 in axial direction is arranged essentially in connection to a central portion of the jacket surface 231 of said housing. Further the connection unit 100 is arranged circumferentially of the jacket surface of the housing in connection to a horizontal middle plane of the jacket surface of the housing between the upper portion 230*a* and the lower portion 230*b* of the of the jacket surface. The connection unit 100 is consequently arranged centrally on one side of the jacket surface 231.

FIG. 6 schematically shows a side view of an electric drive device IV according to an embodiment of the present invention and FIG. 7 schematically shows a radial cross sectional view of the electrical drive device IV according to FIG. 6.

The housing 330 of the electric drive device IV according to this embodiment has an opening 314 formed through a port 312 of the jacket surface 331 of the housing 330 arranged in the middle area along a side of the housing 330 in the lower area between the uppermost portion 330a and the lowermost portion 330b of the jacket surface 331 of the housing 330 such that a connection unit according to the present invention may be connected and cables from the electric motor and cooling and lubrication conduits may be led out of the housing 330. According to an embodiment of the present invention the connection unit 100 is configured to be arranged in connection to said opening 313.

Figure 8B:
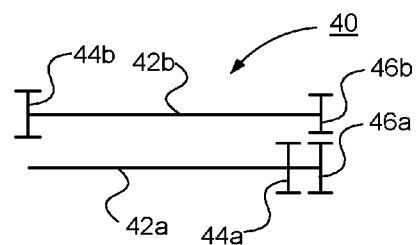

FIG. 8a schematically shows an axial cross sectional view of an electric drive device 10 according to an embodiment of the present invention, the electric drive device being in accordance with the electric drive device in FIG. 3, and FIG. 8b a view from above of a differential device 40 of the electric drive device 10 in FIG. 8a. The electric drive device 10 comprises an electric motor 20 and a housing 30 in which the electric motor is housed. The electric drive device is arranged to drive a motor vehicle.

The electric motor 20 comprises a rotor 22 and a stator 24, said rotor 22 being connected to a drive shaft 26 or rotor shaft 26 and being arranged to rotate said drive shaft 26. The drive shaft 26 is arranged to run concentrically relative to the rotor 22, wherein the rotor 22 is arranged to surround the drive shaft 26. The stator 24 is arranged to surround the rotor 22, wherein the rotor shaft and consequently the 22 are arranged concentrically relative to the stator 24. The electric motor 20 and consequently the drive shaft 26 are according to a variant intended to be arranged transversely to the longitudinal extension of the vehicle, wherein the drive shaft is connected and arranged for driving the drive wheels of the vehicle. The drive shaft 26 is arranged to run essentially horizontally. The drive shaft 26 is intended to be connected and drive ground engaging members such as drive wheels or drive tracks. The electric drive device 10 is consequently arranged to drive ground engaging members such as drive wheels or drive tracks for propulsion of the motor vehicle.

The drive shaft 26 according to this embodiment consequently runs concentrically relative to the imaginary centre axle of the electric motor 20. Hereby a desired space 36 is formed between the electric motor and said housing. Said desired space 36 has a valley-like configuration.

The housing has an essentially ring shaped cross section with an imaginary centre axel X. According to this embodiment the housing 30 has an essentially circular cross section. The electric motor 20 is arranged eccentrically displaced in the housing 30 in such a way that the drive shaft 26 of the electric motor 20 runs parallel to and at a distance from the centre axel X of the housing 30 for forming of said desired space 36. The housing 30 is consequently intended to be essentially horizontally arranged such that the imaginary centre axel X runs essentially horizontally.

The electric motor 20 is according to this embodiment displaced mainly radially upwards in the essentially circular cylindrical housing 30. The housing 30 constitutes a middle part of a supporting structure in the electric drive device 10. According to a variant the displacement of the drive shaft 26/imaginary centre axle 26 relative to the imaginary axle of the housing 30 is 20-100 mm, according to a variant about 45 mm. Said displacement may be within any suitable range comprising greater ranges than above. Said desired space consequently runs axially in the lower area of the housing 30.

The won centimeters under the electric motor due to the eccentric placement of the electric motor 20 relative to the drive shaft are utilized for placement of a differential configuration 42a, 42b of the differential device 40 and oil sump O. Further is facilitated to via connection unit in a smooth way taking out the cables from the middle of the housing 30, which is illustrated among other in FIGS. 6 and 7 and explained in more detail below.

The electric drive device 10 comprises an output shaft 12 connected to the drive shaft 26. The output shaft 12 is according to this embodiment aligned with the drive shaft 26. The output shaft 12 according to this embodiment extends through said drive shaft 26.

The electric drive device 10 comprises according to this embodiment differential means arranged in the housing 30. Said differential means comprises a first transmission configuration 50 and a second transmission configuration 60, the electric motor 20 being arranged between said first and second planetary gear configuration 50, 60.

The first planetary gear configuration 50 comprises planetary gears 52, a sun gear 54, and a ring gear 56. The second planetary gear configuration 60 comprises planetary gears 62, a sun gear 64, and a ring gear 66.

The first and second planetary gear configuration 50, 60 are drivingly connected to each other via said output shaft 12. The output shaft 12 is connected to the sun gear 54, 64 of the respective planetary gear configuration 50, 60.

The differential means comprises the differential device 40 engaged with the ring gear 56 of the first planetary gear configuration 50 and the ring gear 66 of the second planetary gear configuration 60 for provision of differential function of a motor vehicle.

The differential device 40 comprises an axle configuration 42a, 42b which is arranged in the housing 30 between electric motor and housing wall of the housing 30 in the space 36 set free through said displacement of the centre axle 26 of the electric motor 20 relative the centre axel X of the housing 30.

As is evident from FIG. 8b the axle configuration comprises a first differential shaft 42a and a second differential shaft 42b which run essentially parallel along each other in the longitudinal direction of the housing in the space 36. The differential device comprises differential gears 44a, 44b, 46a, 46b, wherein the gear 44a on the first differential shaft 42a is meshed with the ring gear 56 and the gear 44b of the first differential shaft 42b is meshed with the ring gear 66.

The differential device 40 is arranged to shift up output shaft 12 on one side at the same time as the other side is shifted down which is accomplished in that the ring gears 56, 66 are allowed to rotate reverse to each other by means of the gears 46a, 46b.

The electric motor 20 of the electric drive device 10 is axially aligned with the output shaft 12 and the axle configuration 42 of the differential device is arranged to run along the jacket surface of the electric motor 20 in space set free due to the displacement of the centre axel of the electric motor 20 relative to the centre axel of the housing 30.

By using a cylindrical housing 30 with a circular cross section a rigid housing 30 is obtained which is easy to manufacture. According to an embodiment the construction element for the housing 30 is constituted by a pipe with a circular cross section which is optimal for absorbing load. By arranging the electric motor 20 eccentrically in such a horizontally arranged housing 30 volume uppermost in the housing 30 is utilized, i.e. the electric motor is arranged such that its upper jacket surface runs axially along the internal upper surface of the housing 30, at the same time as the axle configuration of the differential device is arranged under the electric motor 20 in the space 36 set free, i.e. the axle configuration is arranged such that it runs axially in the space 36 along the internal lower surface of the housing 30, wherein a compact construction is obtained, at the same time as a circular cylindrical pipe is utilized with the above mentioned advantages.

The electric motor 20 is consequently according to this embodiment placed eccentrically in the circular cylindrical housing 30 arranged horizontally in a vehicle, i.e. the rotational centre of the drive shaft 26 is radially displaced relative to the imaginary centre axle X of the circular cylindrical housing 30, wherein space thereby is given to the axle configuration 42a, 42b of the differential device in the housing in the axially running space 36 below the electric motor 20. The volume made available when the electric motor is displaced is utilized as an oil sump O and as mentioned provides space for the axle configuration 42a, 42b of the differential device 40 and in the prolongation also a not shown differential brake/torque vectoring. Further the space 36 set free facilitates for collecting connections for lubrication means, cooling means, power supply and sensors etc. and connect these to connection unit according to the present invention.

As the output shaft extends through said drive shaft a motor-in-shaft solution with output shaft 12 via planter gear configuration 50, 60 on the respective side of the electric motor 20 is obtained. A motor-in-shaft-solution does not require any cardan shaft but all power supply is effected via cable. Specific for application according to this embodiment with electric motor 20 eccentrically arranged in the housing 30 with a circular cross section a compact and volume efficient device is obtained, at the same time as the housing 30 maintains a circular cylindrical shape for best strength and rigidity.

The electrics drive device 10 according to the present invention is intended mainly for medium and heavy special vehicles. Hereby the electric motor 20 is horizontally placed in the vehicle wherein the jacket 21 of the electric motor 20 and the jacket 31 of the housing runs in the transverse direction of the vehicle. The electric motor 20 is further eccentrically placed relative to the circular cylindrical housing 30 arranged in the vehicle, wherein at the same time coaxiality is maintained between drive shaft and output shaft and consequently drive wheels.

FIG. 9a-d schematically show radial cross sectional views of an electric drive device V; VI; VII; VIII according to different embodiments of the present invention, where according to the embodiments in FIG. 9a-c the housing 430; 430; 630 has different ring shaped cross section with electric motor 20 eccentrically placed relative the housing, and where according to the embodiment in FIG. 9d the housing 730 has a circular cross section with electric motor 20 concentrically placed relative to the housing 730.

All embodiments according to FIG. 9a-d have a connection unit 100 for media supply comprising supply of electric energy to the electric motor 20 and supply of cooling and lubrication means to electric motor 20 and transmission configuration, the connection unit 100 being arranged in connection to the jacket surface 21 of the electric motor 20, wherein said media supply is arranged to be effected via the connection unit 100.

The connection unit 100 is connected to the housing 430; 430; 630; 730, wherein an opening of the housing 430; 430; 630; 730 allows feeding from said connection unit to the drive unit for cables for feeding of electric energy to the electric motor 20 and cooling and lubrication conduits for cooling and lubrication of electric motor and transmission configurations. Said opening may in said embodiments of housing be arranged on any suitable place on the housing in accordance with what has been described above.

Above an electric drive device I; IV with a housing 30; 330 for housing an electric motor 20, where the housing 30; 330 has an essentially circular cross section with an imaginary centre axle X has been described.

Figure 9A:
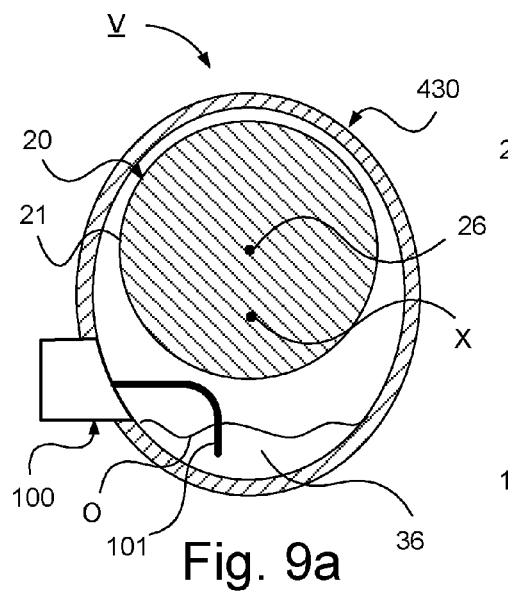
FIG. 9a-d schematically show radial cross sectional views of the electric drive device according to alternative embodiments of the present invention.

According to an alternative embodiment illustrated in FIG. 9a the electric drive device III has a housing 330 with an essentially elliptic cross section with a centre axle X, wherein the electric motor 20 is eccentrically displaced in the housing 430 in such a way that the drive shaft 26/centre axle 26 of the electric motor 20 runs parallel to and at a distance from the centre axle of the housing 430.

Figure 9B:
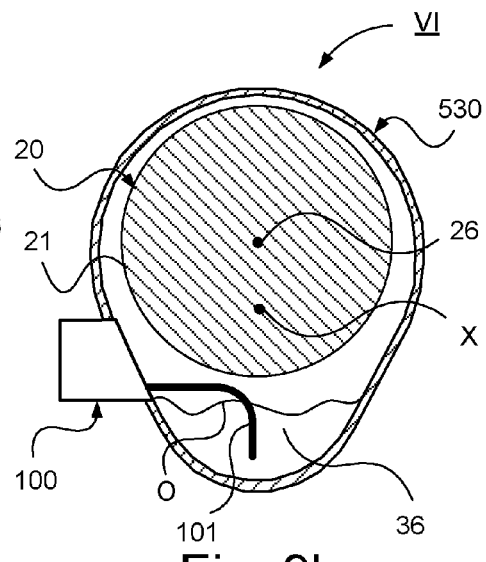

According to an alternative embodiment illustrated in FIG. 9b the electric drive device IV has a housing 530 with an essentially egg shaped cross section with a centre axle X, wherein the electric motor 20 is arranged eccentrically displaced in the housing 530 in such a way that the drive shaft 26/centre axle 26 of the electric motor 20 runs parallel to and at a distance from the centre axel X of the housing 530.

Figure 9C:
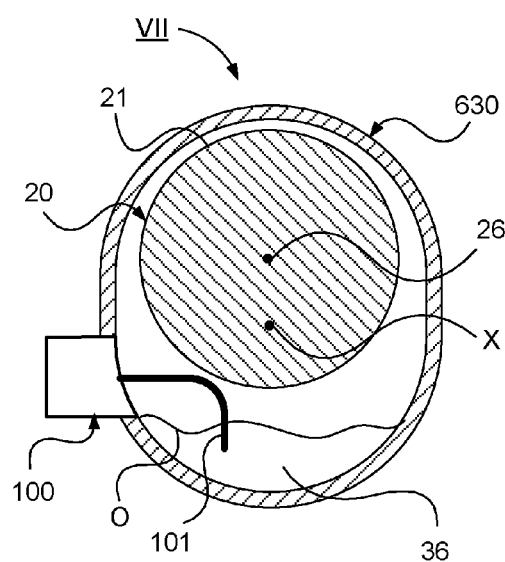
Figure 9D:
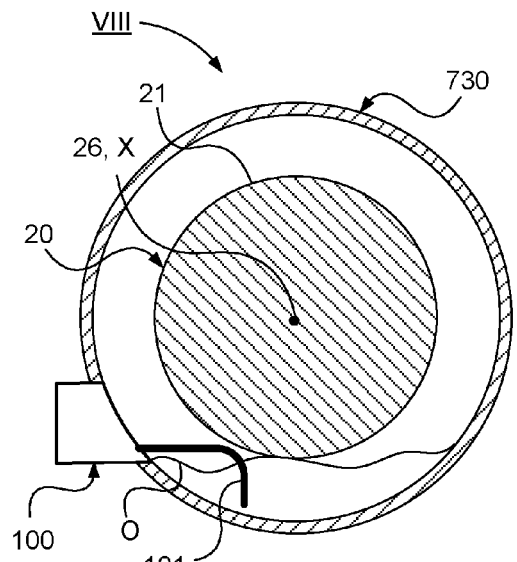

According to an alternative embodiment illustrated in FIG. 9c the electric drive device V has a housing 630 with an essentially elongated cross section with parallel sides and semi circular ends with a centre axle X, wherein the electric motor 20 is arranged eccentrically displaced in the housing 630 in such a way that the drive shaft 26/centre axle 26 of the electric motor 20 runs parallel to and at a distance from the centre axle of the housing 630.

Above an electric drive device where the electric motor is eccentrically placed in the housing has been described. According to an alternative embodiment illustrated in FIG. 9d the electric drive device VI has a housing 730 with an essentially circular cross section with a centre axle X, wherein the electric motor 20 is concentrically arranged in the housing 730 in such a way that the drive shaft 26/centre axle 26 of the electric motor 20 is aligned with the centre axle of the housing 730.

Above an electric drive device with a ring shaped housing and en electric motor eccentrically placed in the housing, the ring shaped housing being intended to be arranged in essentially horizontally transversal to the longitudinal direction of the vehicle such that the drive shaft of the electric motor for propulsion of the vehicle runs transversal to the longitudinal direction of the vehicle for drive of ground engaging members such as drive wheel or drive tracks.

Alternatively the ring shaped housing of the electric drive device with ring shaped housing and the electric motor placed eccentrically in the housing is intended to be arranged essentially horizontally in the longitudinal direction of the vehicle such that the drive shaft of the electric motor for propulsion of the vehicle runs in the longitudinal direction of the vehicle, wherein a cardan shaft is arranged for transferring drive power from the drive shaft to ground engaging drive wheels or drive tracks.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An electric drive device for driving of a motor vehicle, comprising:
   an electric motor arranged to be media supplied, the electric motor having a jacket surface and an essentially ring shaped cross section, wherein media supply is arranged to be effected via a connection unit arranged in connection to the jacket surface of the electric motor;
   a housing in which the electric motor is housed, the housing having a jacket surface and an essentially ring shaped cross section, the connection unit being applied to the jacket surface of the housing, the media supply being effected via an opening penetrating through the jacket surface of the housing, a portion of the connection unit extending through the opening of the housing to be exposed outside the housing, and a surface of an inner wall of the connection unit being circumferentially aligned with an inner circumferential surface of the housing, wherein an oil sump is arranged at the bottom of the housing in a space between the electric motor and the housing under the lowermost portion of the jacket surface of the electric motor for cooling and lubrication; and
   a differential device with a shaft configuration arranged in the housing and in the space between the electric motor and the housing, wherein the space in which the differential device is arranged is below the electric motor.

2. An electric drive device according to claim 1, wherein said connection unit is arranged between the upper and lower portion of jacket surface of said housing.

3. An electric drive device according to claim 1, wherein said connection unit is axially arranged essentially in connection to a central portion of the jacket surface of said housing.

4. An electric drive device according to claim 1, wherein said connection unit circumferentially of the jacket surface of the housing is placed in connection to a horizontal middle plane of the jacket surface of the housing.

5. An electric drive device according to claim 1, wherein the horizontal direction of the jacket surface of the housing is running in the transverse direction of the vehicle.

6. An electric drive device according to claim 1, wherein said media supply comprises energy supply by means of power electronics and/or cooling and lubrication means supply.

7. An electric drive device according to claim 1, further comprising arrangements for controlling said media supply via said connection unit to an applicable extent.

8. An electric drive device according to claim 1, further comprising arrangements for outputting information relating to drive of the electric drive device via said connection unit.

9. An electric drive device according to claim 1, wherein the electric motor has a stator and a rotor arranged to rotate a drive shaft, wherein the electric motor is arranged in the housing in such a way that the centre of rotation of the drive shaft of the electric motor runs essentially parallel to and at a distance from an imaginary centre axle of the housing for forming said space.

10. A motor vehicle comprising an electric drive device according to claim 1.

* * * * *